(12) United States Patent
Price et al.

(10) Patent No.: US 6,619,339 B2
(45) Date of Patent: Sep. 16, 2003

(54) PNEUMATICALLY CONTROLLED VOLUMETRIC POCKET FILLER

(75) Inventors: Richard Price, Lehi, UT (US); Byron Larson, South Jordan, UT (US)

(73) Assignee: Multi-Fill, Inc., West Jordan, UT (US)

( * ) Notice: Subject to any disclaimer, the term of this patent is extended or adjusted under 35 U.S.C. 154(b) by 47 days.

(21) Appl. No.: 10/037,939

(22) Filed: Jan. 3, 2002

(65) Prior Publication Data

US 2002/0144748 A1 Oct. 10, 2002

Related U.S. Application Data

(60) Provisional application No. 60/281,464, filed on Apr. 4, 2001.

(51) Int. Cl.[7] ............................................. G01F 11/10
(52) U.S. Cl. ........................... 141/138; 141/1; 141/67; 141/94; 141/261; 222/361
(58) Field of Search ..................... 141/1, 67, 94, 141/129, 138, 140, 156, 157, 258, 261; 222/1, 23, 195, 263, 275, 361

(56) References Cited

U.S. PATENT DOCUMENTS

| | | | |
|---|---|---|---|
| 2,670,101 A | * | 2/1954 | Heisterkamp ................ 222/1 |
| 3,580,298 A | * | 5/1971 | Trusselle ..................... 141/40 |
| 4,733,803 A | | 3/1988 | Sisson et al. |
| 4,801,097 A | * | 1/1989 | Fitch, Jr. ..................... 241/34 |
| 4,913,202 A | | 4/1990 | Miller et al. |
| 5,029,735 A | * | 7/1991 | Dennis et al. ............... 222/255 |
| 5,143,126 A | | 9/1992 | Boesch et al. |
| 5,407,102 A | * | 4/1995 | Freudinger et al. ......... 222/309 |
| 6,041,835 A | | 3/2000 | Price |
| 6,145,552 A | | 11/2000 | Price et al. |
| 6,269,850 B1 | | 8/2001 | Price et al. |

* cited by examiner

Primary Examiner—Gregory Huson
Assistant Examiner—Peter deVore
(74) Attorney, Agent, or Firm—Thorpe North & Western, LLP

(57) ABSTRACT

A controller for a volumetric pocket filler having a plurality of pneumatically powered components, includes a pneumatically powered actuator, having a motion path, and a plurality of pneumatic switches, disposed along the motion path of the actuator. The pneumatic switches are configured for contact with the actuator, to control air flow to the plurality of pneumatically powered components of the volumetric pocket filler.

20 Claims, 7 Drawing Sheets

PNEUMATICALLY CONTROLLED VOLUMETRIC POCKET FILLER

This application claims priority from U.S. Provision Patent Application Ser. No. 60/281,464, filed on Apr. 4, 2001, and entitled PNEUMATICALLY CONTROLLED VOLUMETRIC POCKET FILLER.

BACKGROUND OF THE INVENTION

1. Field of the Invention

The present invention relates generally to product filling machines for packaging food products and the like. More particularly, the present invention relates to a simplified pneumatic controller for controlling all functions of a linear volumetric pocket filler.

2. Related Art

In the food processing and other similar industries, many products are packaged using mechanical product measuring and dispensing machines. Examples of such machines are shown in U.S. Pat. Nos. 6,041,835 and 6,145,552, for example. Such packaging machines generally comprise a measuring and discharge head which is positioned above a conveying device, such as a conveyor belt. The conveying device moves empty containers past the discharge head, while the discharge head portions and drops the product into each container as it passes by. The containers may move past more than one such machine if multiple products are to be placed therein, and then they typically proceed to an additional machine which places a top seal or cap on the container to seal it. These types of product filling machines help ensure precise portion measurements, and also avoid some of the labor cost, cleanliness, and other drawbacks of hand packaging.

The moving components of a mechanical product measuring and dispensing machine may be powered by pneumatic actuators. In prior machines, the operation and timing of the pneumatic actuators is typically controlled by a complex electronic controller incorporating a microprocessor, multiple power conversion components, an air compressor, various types of transducers, and pneumatic switches and valves, which ultimately control the pneumatic actuators. Through modification of the software, the timing and operation of a variety of electronic, pneumatic, and other components can be very accurately and independently controlled to allow one system to accommodate a variety of products and packaging criteria.

While such a prior art system is very versatile, it is also very complicated and expensive. Many product packaging operations neither need such flexibility, nor justify the expense of such a system. In many operations, a machine incorporating just one or a few of the operating configurations of the microprocessor controlled system is sufficient. Moreover, providing both electrical and compressed air power sources to a single product packaging machine imposes greater facilities requirements on the user.

SUMMARY OF THE INVENTION

It has been recognized that it would be advantageous to develop a controller for a volumetric pocket filler that uses only a compressed air source to power its basic functions.

It has also been recognized that it would be advantageous to develop a controller for a volumetric pocket filler that is relatively simple and inexpensive.

The invention advantageously provides a simplified controller for a volumetric pocket filler having a plurality of pneumatically powered components. In one illustrative embodiment, the controller comprises a pneumatically powered actuator, moveable along a motion path, and a plurality of pneumatic switches, disposed along the motion path of the actuator. The pneumatic switches are configured for contact with the actuator, to control air flow to the plurality of pneumatically powered components of the volumetric pocket filler.

In accordance with a more detailed aspect of the present invention, the pneumatically powered actuator comprises a pneumatic cycle control cylinder with a piston rod having an actuator block disposed on its end. The piston rod travels through a linear stroke, from a home position to an extended position. As the piston rod extends from the home position to the extended position, then back again, the actuator block sequentially contacts and then releases the plurality of pneumatic switches.

In accordance with another more detailed aspect of the present invention, the plurality of pneumatic switches are locationally adjustable relative to the motion path of the actuator block, such that the relative timing of operation of their associated components may be adjusted.

In accordance with yet another more detailed aspect of the present invention, the controller includes a one shot cycle control system, for preventing undesired repeated operation of the controller in the event the container conveyor stops.

Additional features and advantages of the invention will be apparent from the detailed description which follows, taken in conjunction with the accompanying drawings, which together illustrate, by way of example, features of the invention.

DETAILED DESCRIPTION

Figure 1:
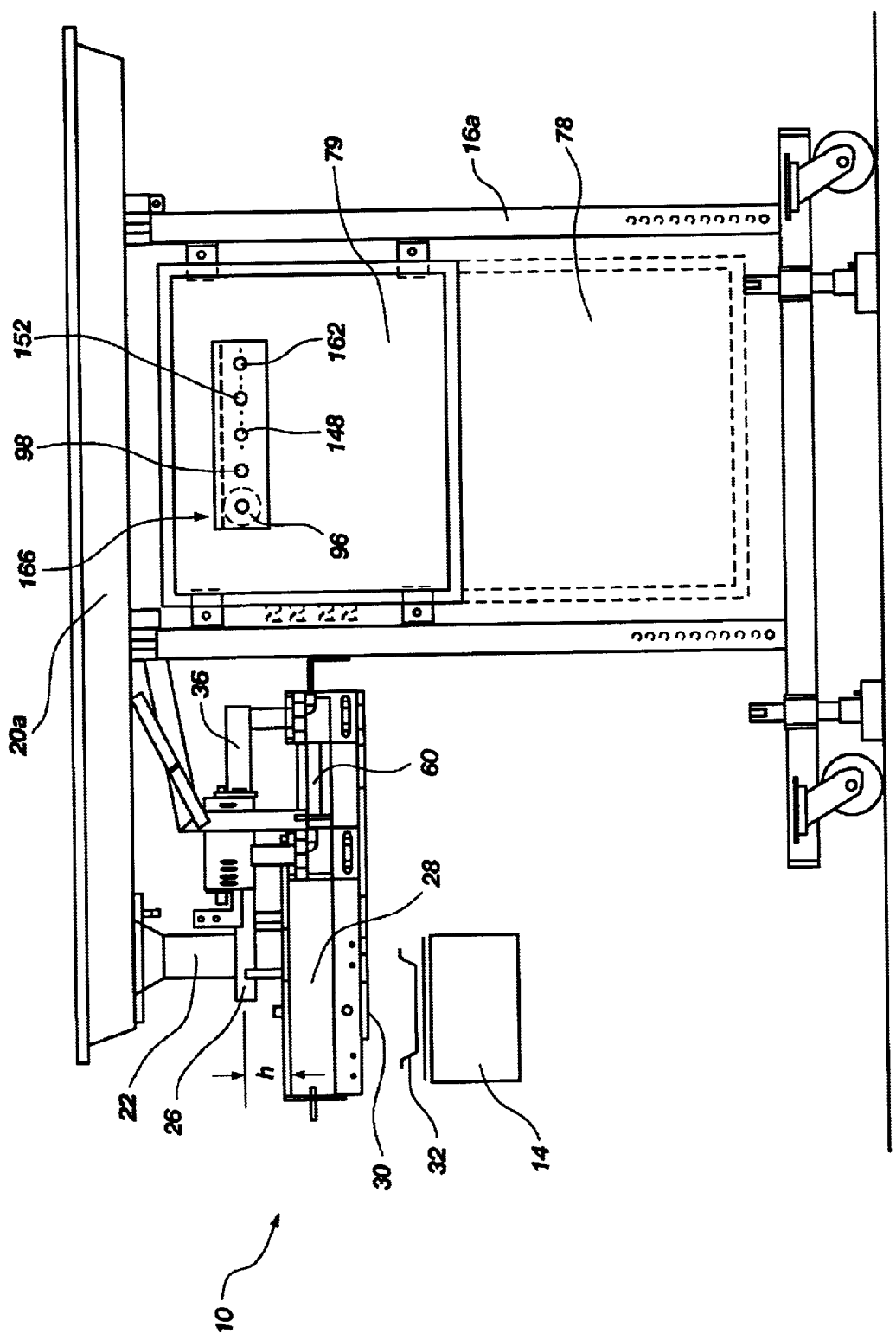
FIG. 1 is an elevational view of a volumetric pocket filling machine provided with a pneumatic controller in accordance with the present invention, shown in operational relationship with a container conveyor.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Figure 2:
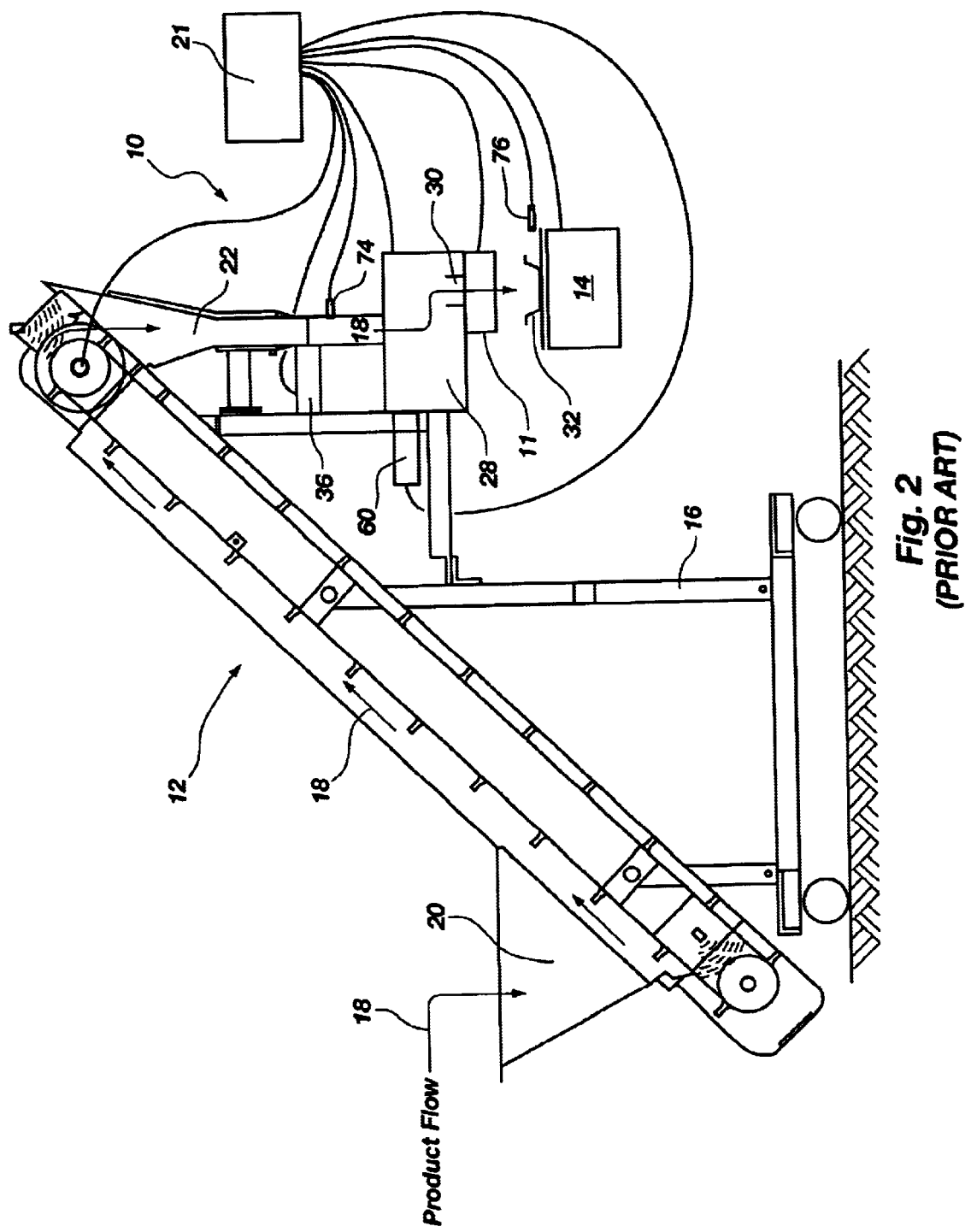
FIG. 2 is an elevational/partial cross-sectional view of a prior art volumetric pocket filling machine in operational relationship with a supply conveyor and container conveyor.

The present invention provides a controller for a linear volumetric pocket filler having a plurality of pneumatically powered components. Examples of such machines are shown in FIG. 1 and FIG. 2, and in U.S. Pat. Nos. 6,041,835, 6,145,552, and 6,269,850, the disclosures of which are incorporated herein by reference in their entirety. Viewing FIGS. 1–3, the volumetric pocket filler 10 generally comprises an inlet 22 for receiving product, a measuring apparatus 26 disposed adjacent to the inlet and configured for measuring and isolating a discrete quantity of the product, and a linearly reciprocating slide block assembly 28 configured for receiving the discrete quantity of product from the measuring apparatus, and allowing the discrete quantity to drop into a container 32 positioned below a discharge pocket 30 of the volumetric pocket filler.

As shown in FIG. 2, associated with the volumetric pocket filling machine 10, is a supply conveyor 12, and container conveyor 14. While there are various types of known pocket filling devices, such as rotary pocket fillers, etc., the filler for which the present invention is particularly adapted is a linear volumetric pocket filler, such as depicted in FIGS. 1 and 2, having a reciprocating slide block. In the view of FIG. 2, the pocket filling machine is shown in longitudinal cross-section, the cross-section taken parallel to the direction of reciprocation of the slide block. In this view, the direction of motion of the container conveyor 14 is into or out of the plane of the drawing, being oriented generally perpendicular to the pocket filler machine. However, it will be apparent that the pocket filling machine 10 need not be oriented perpendicular to the container conveyor 14, and the slide block 28 may be configured to reciprocate in any direction relative to the conveyor, from perpendicular to parallel.

As depicted, the supply conveyor 12 is mounted on a moveable frame 16, to which the volumetric pocket filling machine is also connected. This configuration allows multiple filling machines 10 to be conveniently located and relocated relative to the container conveyor so as to accommodate operations such as multiple product dispensing into multiple compartment containers and so forth, as is well known in the industry.

The path of the particulate product during operation of the particulate product filling machine 10 of FIG. 2 is indicated by arrows 18. In operation, the conveyor 12 draws product out of a supply hopper 20, and drops it into inlet tube 22 of the volumetric pocket filling machine 10. Using a measuring apparatus 36 and slide block mechanism 28, the filling machine 10 mechanically measures a discrete quantity of the product, then allows the product to drop through a discharge pocket 30 and into a container 32 located directly below on the container conveyor 14. A reciprocating following pocket 11 may also be disposed below the discharge pocket 30, as disclosed in U.S. Pat. No. 6,145,552.

A particulate product measuring and filling machine suitable for use in conjunction with the present invention may take a variety of configurations other than that shown in FIG. 2. For example, referring to FIG. 1, rather than incorporating a product conveyor 12 to transport the product into the inlet tube 22, the volumetric pocket filling machine may comprise a product hopper 20a which is disposed above the inlet tube 22. This simplified configuration allows the product hopper to be filled in other ways, such as manually.

Figure 3:
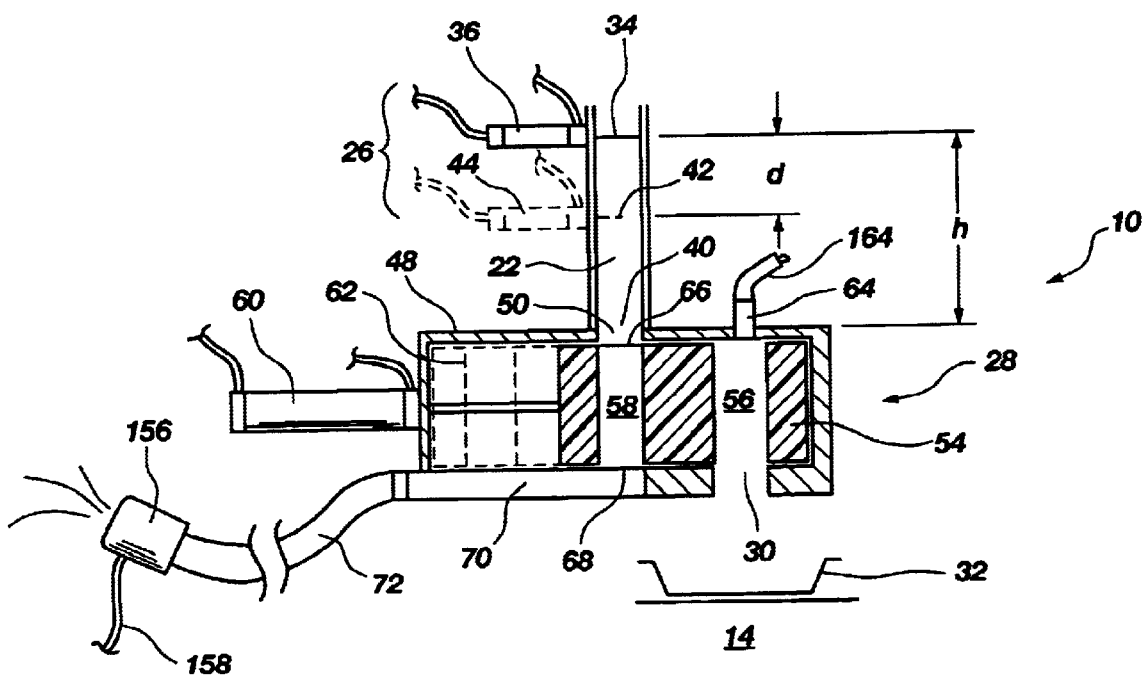
FIG. 3 is a cross-sectional view of the slideblock assembly and related components of the volumetric pocket filling machine of FIGS. 1 and 2.

Viewing FIG. 3, a close-up cross-sectional view is provided of the volumetric pocket filling machine 10, showing the measuring apparatus 26 and slide block mechanism 28 in more detail. The measuring apparatus 26 is disposed within inlet tube 22 as near to its top as practicable, and preferably comprises a separator powered by pneumatic cylinder 36. The separator comprises a reciprocating gate 34 which is configured to selectively extend across the inlet tube, to block the flow of product therein, or retract from across the tube to allow product to pass.

The reciprocating gate 34 is moveable from a first position, wherein it extends across the cross-section of the inlet conduit 22, to a second position, wherein it is retracted out of the conduit to allow product to pass. The reciprocating gate may take many forms, such as a knife gate or a needle separator. The knife gate may be a solid or perforated metal slide gate, while the needle separator comprises a plurality of needles or wires, which are configured to extend across the opening of the tube. These may be parallel needles which reciprocate across the inlet tube. A suitable needle separator and its incorporation into a linear volumetric pocket filler are disclosed more fully in U.S. Pat. No. 6,269,850. A needle separator is preferred for many products because it is more gentle. When a knife gate extends, it may cut individual pieces of product which have not completely passed by. However, rather than cut product which may be in its path, the needle separator is more likely to thread its way through the product and push individual pieces aside when it extends. Moreover, even if a needle pierces the product, this may be less damaging than cutting, depending upon the product.

It will be apparent that many other mechanisms may be used for the separator. For example, the separator may comprise a hinged gate which is disposed within the inlet tube, the gate being solid or perforated or comprising a plurality of needles, not necessarily parallel. Alternatively, the separator may comprise a constricting mechanical aperture similar to a photographic lense aperture, comprising flat plates which are oriented in a roughly circular configuration and simultaneously slide toward the center of the inlet tube. Other devices may also be used. Any device which is configured for selectively mechanically blocking and opening the inlet tube will be suitable.

To measure a portion of product, the separator pneumatic cylinder 36 causes the separator 34 to rapidly retract from blocking conduit 22 for a brief time, and then extends it again to block the conduit. Naturally, when the separator retracts, product retained thereabove will begin to fall within the inlet conduit 22. Then, when the separator 34 is extended, the stream is blocked again, thus allowing only that quantity of product which has already fallen past the separator to continue toward the bottom 40 of the inlet conduit 22.

Located below the bottom 40 of the inlet conduit 22 is the slide block assembly 28. A detailed, partial cross-sectional view of a typical slide block assembly is given in FIG. 3. As shown, the slide block assembly generally comprises a housing 48 having an inlet 50, a discharge pocket 30, a slide block 54 having a product transfer pocket 56 and a vacuum aperture 58, and a reciprocal actuator 60 for causing linear reciprocation of the slide block 54 within the housing 48. The actuator 60 as shown herein is preferably a pneumatic cylinder.

The slide block may be formed as a substantially solid rectangular block of material, such as UHMW (Ultra High Molecular Weight) polyethylene. The vacuum aperture 58 and product transfer pocket 56 extend entirely through the slide block from the top surface to the bottom. The product transfer pocket may be configured to have a size significantly larger than the intended volume of the measured product portion, so that when the portion is contained within the product transfer pocket there is little likelihood of damage to the product due to the motion of the slide block 54.

In operation, the slide block 54 moves from a first position (designated by phantom lines 62 in FIG. 3) wherein the product transfer pocket 56 is disposed below the inlet tube 22, to a second position (shown in solid lines in FIG. 3) wherein the product transfer pocket is disposed above the discharge pocket 30, and the vacuum aperture 58 is disposed below the inlet tube 22. In the first position 62, product falls into the product transfer pocket 56 from the inlet tube 22. In the second position, product falls from the product transfer pocket, through the discharge pocket 30, and into the container 32. The measured portion of product may be assisted in dropping from the product transfer pocket and through the discharge pocket by an air jet 64 disposed above the discharge pocket within the slide block housing 48. This air jet may inject a continuous or intermittent an air stream to help eject the measured portion from the product transfer pocket at the appropriate time.

Disposed in the slide block 54 at the top of the vacuum aperture 58, and in the slide block housing 48 directly below the inlet tube 22, are first and second screens 66 and 68, respectively, which serve to catch product while allowing air flow therethrough. These screens are associated with an air conduit 70 and vacuum conduit 72, which supply vacuum pressure to the inlet tube to assist the product in quickly and completely dropping down through the inlet when released by the separator 34, and in further dropping into the product transfer pocket when the slide block is moved into the proper position. When the slide block 54 is in the second position (as depicted in solid lines in FIG. 3), with the product transfer pocket 56 above the discharge pocket 30 and the vacuum aperture 58 below the inlet tube 22, air flow through the first and second screens 66 and 68 provides vacuum pressure to encourage product to drop through the inlet conduit and come to rest on the first screen 66. Then, when the slide block returns to the first position 62, the product resting on the first screen falls into the product transfer pocket 56, again aided by the vacuum pressure which is drawn through the product transfer pocket 56 and second screen 68 therebelow. It will be apparent that the exact timing of the product dropping into the product transfer pocket will depend upon the exact timing of the separator relative to the slide block.

There are several methods by which the separator determines the quantity of the measured portion. One alternative is purely timed extension and retraction of the separator 34. In this method, the time interval during which the separator is retracted will determine the volume of the product quantity, depending upon the flow rate of the product through the inlet tube 22.

Alternatively, the separator 34 may be disposed a height h above the top of the slide block 54, which height corresponds to the desired volume (depending on the cross-sectional size of the inlet tube 22). When the separator retracts, product drops down through the inlet tube and comes to rest on screen 66 (when the slide block is in the extended position), filling the lower portion of the inlet tube up to and past the separator. The separator then extends, dividing the product below from that above. When the slide block retracts, placing the product transfer pocket 56 below the inlet tube 22, all of the product below the separator falls into the product transfer pocket, while that above is retained. The height h may be adjustable by means of a rack and pinion mechanism (not shown) which allows adjustment of the distance between the separator 34 and the top of the slide block housing 48. For clarity, the distance h in FIG. 3 is somewhat exaggerated. FIG. 1 shows a more accurate depiction of the position of the separator relative to the slide block assembly 28.

As yet another alternative, rather than a single separator 34 which measures product based solely upon its time of retraction, a second separator 42 and pneumatic cylinder 44 (shown in phantom lines in FIG. 3) could also be provided some distance d below first separator 34. With this configuration, a discrete portion may be separated by alternately extending and retracting the first and second separators 34 and 42, so that a portion of product is first trapped between the separators, and then dropped by the retraction of the second separator 42 while the remainder of the product flow is retained above the first separator 34. It will be apparent that the volume of the discrete quantity in this alternative would depend upon the diameter of inlet conduit 22 and the distance d between the first and second separators, which distance could be mechanically adjustable, such as by means of a sliding collar or tube (not shown) associated with the inlet tube.

The volumetric pocket filling machines depicted in FIGS. 1 and 2 are powered by pneumatic actuators. These pneumatic components may be controlled in many ways, such as by a combination of servo systems, detectors, and actuators, to allow synchronous operation. In prior embodiments of the volumetric pocket fillers depicted in FIGS. 1–3, the coordinated operation of the separator 26, slide block assembly 28, and perhaps also the conveyor 14, is controlled by a controller 21 (FIG. 2) which precisely governs the speed, timing, direction, and all other aspects of motion of the slide blocks and separators. In these prior systems, the controller is very complex, and includes a high voltage electrical power input, circuit breakers, transformers for converting AC to DC, frequency inverters for variable speed drives, noise suppression filters, electrical solenoids, a high voltage electrically powered liquid ring vacuum pump, solenoid-controlled pneumatic valves, and so forth.

With continued reference to FIG. 2, the controller 21 may also include a microprocessor (not shown) having various input/output cards, a programmable logic unit, and an interface for receiving input from a variety of electronic, optical, or pneumatic sensors and detectors which monitor the operation of the system. For example, one or more optical product sensors 74 may be disposed within the inlet conduit 22 to detect the presence of product. Similarly, a weigh-in-motion scale (not shown) could be associated with the conveyor 14 to sense the weight of the portions which the pocket filler is actually putting out. An optical sensor 76 may also be disposed along the conveyor to detect the approach of a container to be filled. Finally, the programmable logic unit includes sophisticated programming for analyzing data input from the sensors, and controlling all the components of the system. The programmable logic unit may automatically adjust the timing of the separator actuator 36 and/or slide block actuator 60 depending on feedback from the various sensors, to allow optimum operation and accurate product measurement.

The programmable logic unit of the controller 21 may be reprogrammable, or incorporate a replaceable program chip (not shown), allowing alteration of the programming of the system, and thus of the operational timing of the pocket filler components, from time to time as needed. For example, by reprogramming the logic unit, the speed, timing, etc. of the slide block 54 and other components may be adjusted to accommodate a different product, expansion of the system, or conversion to different types of packaging machines. While this type of control system is very flexible, it is also very expensive. Many product packaging operations do not require the flexibility offered by this type of controller, and cannot justify the expense. This system is also very large. Viewing FIG. 1, the cabinet 78 (shown in phantom lines) required to house the prior controller is significantly larger than the pocket filler machine 10 itself.

Advantageously, the present invention provides a simplified pneumatic controller, which is smaller and simpler than the prior controller, yet provides accurate, efficient operation of the volumetric pocket filler for a wide variety of product packaging operations. The simplified controller includes a pneumatically powered actuator block, having a motion circuit or motion path. Disposed along the motion path are a plurality of pneumatic switches configured for contact with the actuator block. The plurality of pneumatic switches are configured for allowing or preventing air flow to the plurality of pneumatically powered components of the volumetric pocket filler. Thus, the system may operate entirely on pneumatic power, rather than a combination of pneumatic, electrical, optical, and other energy sources. It is also significantly smaller than the prior controller, fitting into a relatively small controller cabinet (79 in FIG. 1).

Figure 4:
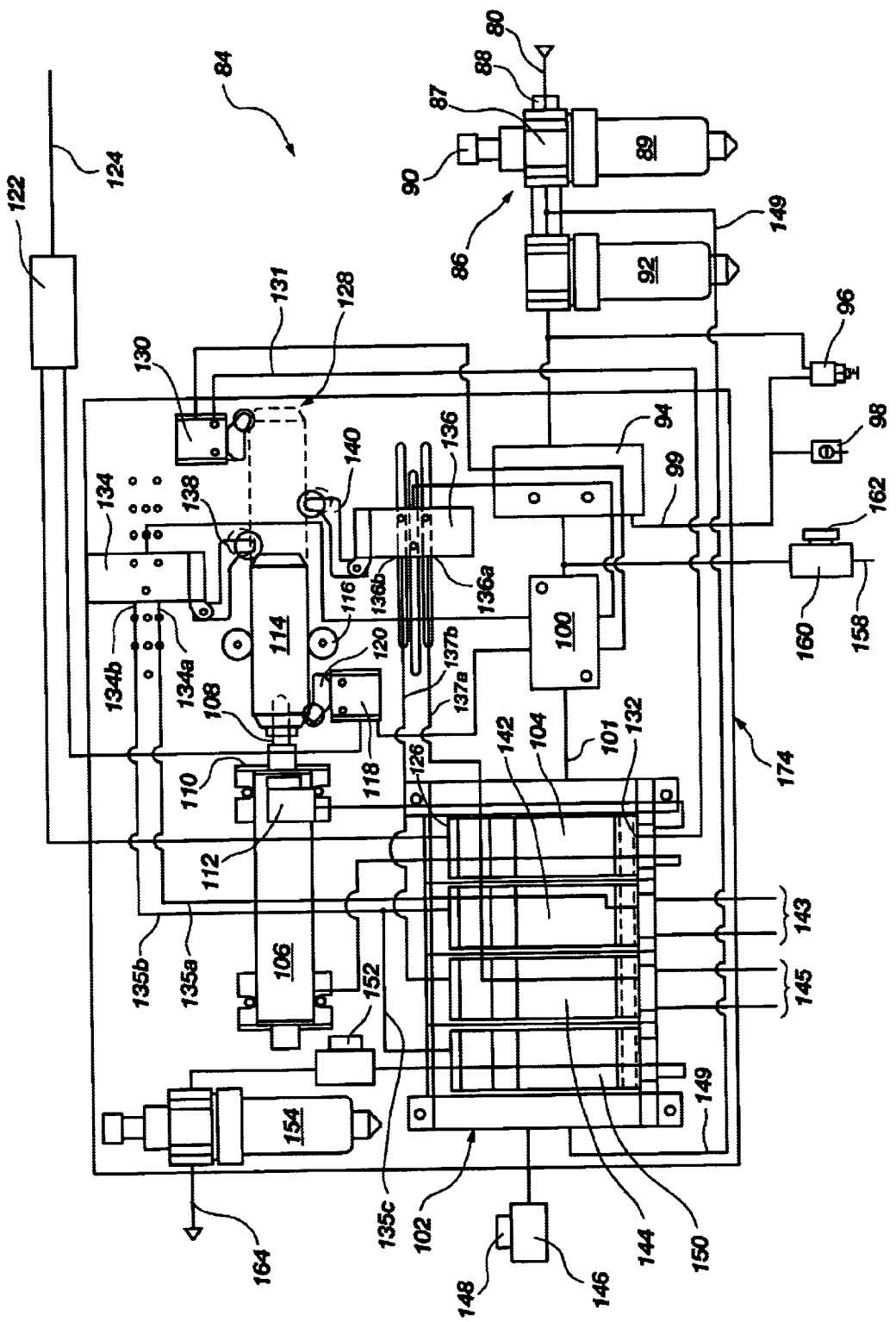
FIG. 4 is a plan view of a pneumatic controller for controlling all functions of the slideblock assembly and related components of the volumetric pocket filler of FIG. 3.

Viewing FIG. 4, an air supply line 80 from a compressed air source (not shown) is connected to the pneumatic controller 84. The pressurized air in the hose first passes through a safety lock-out valve 88 which, when closed, disables the entire controller. Following the lock-out valve 88, air passes through a filter/regulator 86. The filter portion 89 of the filter/regulator 86 removes from the air stream possible contaminants which could clog or damage the pneumatic components of the system. The regulator portion 87 of the filter/regulator allows adjustment of the pressure of air into the controller system by means of an adjustment knob 90, and may also include a pressure gauge (not shown) for providing a visible pressure indication to a user. A suitable filter/regulator device which has been used by the inventors for this application is the 05E22A13A Filter/Regulator manufactured by Parker Pneumatic Division of Parker Hannifin Corporation of Richland Michigan ("Parker Pneumatic").

Following the filter/regulator 86, the air passes across a lubricator 92, which disperses lubricating fluid into the air flow to lubricate the components of the system. A suitable lubricator device which has been used by the inventors for this application is the 15L22N Lubricator manufactured by Parker Pneumatic.

After passing through the filter/regulator 86, and the lubricator 92, the compressed air passes through an air intake and safety valve 94. The safety valve 94 is a 3-way pneumatic safety valve which allows rapid shutdown of the system if needed through rapid discharge of all compressed air. The air intake and safety valve is in fluid communication with an emergency stop switch 96 and "on" indicator 98. The emergency stop switch as depicted is a mushroom push-pull switch, such as model no. ZB2BT4 available from Parker Pneumatic. The emergency stop switch 96 and "on" indicator 98 are connected to safety valve 94 by pilot line 99. When switch 96 is pulled, this triggers safety valve 94 to the open position, allowing the system to operate. When switch 96 is pushed, this triggers safety valve 94 to close, causing the entire system to stop.

A suitable "on" indicator 98 is model no. PXVF131 available from Parker Pneumatic. When the system is charged with compressed air (i.e., is operating) the "on" indicator displays a bright colored side of an indicator ball in its window. When the system is not pressurized, the ball rotates to a position where its bright colored side is not visible. This provides a positive indication of system operation which operates on the compressed air which powers the system, rather than electricity.

Following the air intake and safety valve, the compressed air supply passes through an air distribution manifold 100, which divides the single air stream into five air streams. One stream flows through line 101 to the air distribution valve bank 102, while the other four flow to each of four control switches disposed along the motion path of an actuator block 114. Though referred to herein as switches, the control switches are actually valves which open or close pneumatic passageways.

The air distribution valve bank 102 includes four valves disposed in a single manifold. The first three of these valves are interconnected with each other and receive compressed air through line 101, while the last is pneumatically isolated from the first three and receives compressed air through line 149. These valves are actuated by pressure through pilot lines, as discussed below, which activates the valves to cause the desired pneumatic output for actuating the system components. A suitable manifold for this purpose may comprise four series Hi valves, a manifold base, pilot block, end pilot kit, and isolator plugs available from Parker Pneumatic. Alternatively, rather than a manifold of multiple connected valves, four separate valves of similar configuration could be used to accomplish the same result.

The first valve in the valve bank 102 is a cycle control cylinder control valve 104, which supplies a portion of the compressed air to the cycle control cylinder 106. The cycle control cylinder 106 may be a conventional double-acting linear pneumatic cylinder which includes a moveable internal piston (not shown) and an elongate piston rod 108 which extends out of an actuating end 110 of the cycle control cylinder. The inventors have used a 1½" bore, 4" stroke double-acting air cylinder made by Parker Pneumatic, but it will be apparent that other products could be used in accordance with the present invention. The cycle control cylinder 106 includes a cycle control cylinder flow regulator 112 which balances the cycle speed to provide smooth operation in both forward and reverse motion. When provided with compressed air, the piston rod 108 extends linearly away from, then retracts linearly toward, the actuating end 110 of the cycle control cylinder, depending on the flow direction of the compressed air.

Attached to the distal end of the piston rod 108 is the actuator block 114 which is configured for physical contact with the actuation levers of the control switches. A pair of actuator block guides 116 are provided to assure a smooth and properly directed course of motion for the actuator block. The cycle control cylinder 106, piston rod 108, and actuator block 114 together comprise the pneumatically powered actuator. Accordingly, as depicted herein, the motion is a linear reciprocating motion. However, it will be apparent that other types of actuators may be suited for use in combination with the present invention. For example, a rotary pneumatic cylinder (not shown) may be used, and may have an actuator block which comprises a cam (not shown) to actuate various switches. Such a rotary actuator may oscillate, going back and forth rotationally for a single cycle, in a manner analogous to the linear reciprocal actuator disclosed herein. Alternatively, a rotary actuator may be configured to rotate in one direction only, with protuberances or cams placed to activate switches disposed around its perimeter. It will be apparent that other types of motion actuators may also be configured to operate with the pneumatic controller disclosed herein.

A cycle home position switch 118 is disposed closest to the actuating end 110 of the cycle control cylinder 106. The actuation lever 120 of the cycle home position switch 118 is normally depressed when the piston rod 108 and actuator block 114 are in a retracted position, closest to the actuating end 110 of the cycle control cylinder 106. This is called the "home" position. The cycle home position switch 118 is a three-way limit switch, which is "open" only when the actuation lever 120 is depressed—i.e. in contact with the actuator block 114. As shown in FIG. 4, the cycle home position switch may be roller operated to provide smooth operation upon contact with the actuator block. A suitable switch for this application is model number PXCM521, manufactured by Parker Pneumatic.

The cycle home position switch 118 is in fluid communication via a pilot line with a container sensor switch 122 disposed adjacent to the container conveyor (14 in FIGS. 1 and 2). The container sensor switch 122 may be a whisker switch, which places a wire 124 or similar structure in the path of containers (32 in FIGS. 1 and 2) on the conveyor, and is actuated by physical contact with a container when it moves past. A suitable whisker switch for this application is the 2-position pneumatic whisker valve no. PXCK21106 from Parker Pneumatic. Alternatively, the container sensor switch 122 could be an electrical switch, such as an electro-optical detector, which controls a pneumatic valve to perform the same functions as the whisker switch. An electrical or optical container sensor switch may be desirable, for example, where the containers to be filled are very small and lightweight, and contact with a whisker may be ineffective, or could disturb the container from its position on the conveyor.

The container sensor switch 122 includes a pneumatic valve which is normally closed, and is connected via a pilot line 123 to a first side 126 of the first air distribution valve 104. When the cycle home position switch 118 is in the open position, compressed air is allowed to flow to the container sensor switch 122. Then, when the container sensor switch detects a container on the conveyor, compressed air is momentarily allowed to flow through the pilot line 123 to the first side 126 of the first air distribution valve 104, thus changing the direction of the first air distribution valve and causing compressed air to flow to the cycle control cylinder 106 in the direction required to extend the piston 108. This begins the motion circuit, or in other words, movement along the motion path.

At a location 128 corresponding to a point of full extension of the piston rod 108 and actuator block 114, is a half cycle return switch 130. The half cycle return switch is a three-way limit switch, like the cycle home position switch 118, and the same type of component is suitable for this application. The half cycle return switch 130 is in fluid communication through a pilot line 131 with a second side 132 of the first air distribution valve 104. Like the cycle home position switch 118, the half cycle return switch 130 is normally closed, until contacted by the actuator block 114 at the point of full extension 128, whereupon it opens. When the half cycle return switch opens, this allows compressed air to flow through the pilot line to the second side 132 of the first air distribution valve 104, thus changing the direction of the valve and causing compressed air to flow into the cycle control cylinder 106 in the direction required to retract the piston. This reverses the direction of the piston rod and actuator block, and begins the second half of the motion circuit.

During its motion circuit, the actuator block 114 contacts several additional switches. As depicted in FIG. 4, these include a slide block control switch 134 and a separator control switch 136. The slide block control switch and separator control switch are 4-way, 5-port, 2-position spool valves, and are depicted with roller operated actuator levers 138 and 140, respectively, for smooth operation. A suitable spool valve for these applications is model number 41022 manufactured by Parker Pneumatic. The actuator levers of these switches have two positions. When in a first or undepressed position, air flow is allowed to pass into first outlets, 134a and 136a, respectively. When in a second or depressed position, air flow passes into second outlets, 134b and 136b, respectively. In this way, the slide block and separator control switches allow constant flow of compressed air in a selected direction.

Viewing FIGS. 3 and 4, the slide block control switch 134 is in fluid communication via pilot lines 135a and b with the slide block control valve 142 (which is part of the air distribution valve bank 102), and controls the direction of the slide block control valve based upon the position of the actuation lever 138. The slide block control valve in turn is connected to the slide block actuator (60 in FIGS. 1 and 2) via actuation lines 143, and causes linear reciprocal motion of the slide block 54 in a direction depending on the orientation of the slide block control valve.

As depicted in the figures, when the actuation lever 138 of the slide block control switch 134 is depressed upon contact with the actuator block 114, the slide block 54 is moved to its forward position, with its product transfer pocket 56 disposed above the discharge pocket 30. When the slide block control switch actuation lever is released, the slide block 54 is caused to move to its retracted position, placing the product transfer pocket below the measuring apparatus 26, i.e., at the bottom of the inlet tube 22, ready to receive a measured portion of product.

As the first half of the motion circuit proceeds, after contacting the slide block control switch 134, the actuator block 114 continues to extend and contacts the actuator 140 of the separator control switch 136. The separator control switch is in fluid communication via pilot lines 137a and b with the separator control valve 144 (part of the air distribution valve bank 102), and controls the motion of the separator actuator 36 through actuation lines 145. As noted above, the separator is one embodiment of a product measuring apparatus 26, and comprises a knife gate or needle separator which selectively extends or retracts within the inlet conduit 22 of the volumetric pocket filler 10 so as to separate a single portion of product from the incoming product stream.

When the actuation lever 140 of the separator control switch 136 is depressed upon contact with the actuator block 114, the separator 34 is retracted from the inlet tube 22 to an open position, allowing product to continue down the inlet tube. When the separator control switch actuation lever is released, the separator is caused to block the inlet tube, preventing product from continuing down the inlet tube. As noted above, the size of the measured quantity of product which is separated in a single cycle may depend upon the relative timing between retraction and extension of the separator, or the distance h of the separator above the top of the slide block. Regardless of the measuring method employed, the relative timing between retraction and extension of the separator is dependent upon the duration of contact of the actuator block with the separator control switch actuation lever, which depends upon the speed of the piston 108 and actuator block.

The actuation levers 138 and 140 of the slide block control switch 134 and the separator control switch 136 remain depressed while in contact with the actuator block 114 as it continues to extend toward the half cycle return switch 130, and then reverses direction and begins to retract during the second half of the motion circuit. As the second half of the motion circuit proceeds, the distal end of the actuator block sequentially passes its contact points with the levers of the separator control switch and slide block control switch, respectively, causing these devices to return to their initial positions. At the end of the cycle, the actuator block 114 is fully retracted to its home position, contacting the cycle home position switch 118, ready for a signal from the container sensor 122 which will initiate the next cycle.

Advantageously, the timing sequence for placing product into containers using the disclosed volumetric pocket filler is symmetrical. Accordingly, as depicted, the actuator block 114 sequentially contacts switches 134, 136, and 130 during the first half of its motion cycle, and then releases them in reverse order in the second half of its motion cycle. It will be apparent that the timing of contact and release of the various switch actuator levers depends upon the physical location of the switches relative to the motion path of the actuator block during the motion circuit, and the speed of the piston during the motion circuit. The speed of the piston in turn is dependent upon the flow rate of compressed air into the cycle control cylinder 106. This flow rate is controlled by a speed control main air flow regulator 146 associated with the air distribution valve bank 102. The main air flow regulator 146 includes a control knob 148 which allows a user to adjust the air flow rate to cause the system to speed up or slow down, as desired.

As indicated in the prior patents discussed above, it may be desirable for the volumetric pocket filler device 10 to include a vacuum source for assisting product in dropping through the inlet tube and into the product transfer pocket. Similarly, it may be desirable to include an air jet above the discharge pocket to assist in discharging the product from the slide block and into the container. These features are easily provided with the controller 84 of the present invention. Viewing FIGS. 3 and 4, a pneumatic vacuum pump 156 may be disposed at an outlet end of the vacuum tube 72 which is connected to the air conduit 70 of the slide block housing 48. The vacuum pump 156 is attached to the compressed air supply via a vacuum pump supply tube 158, and operates on the venturi effect to create a vacuum at the outlet of the vacuum tube by virtue of the high velocity motion of compressed air which is released adjacent to the outlet. A suitable venturi vacuum pump is the 6062 Line Vac made by Exair Corp. of Cincinnati, Ohio. Viewing FIG. 4, a vacuum control valve 160 with control knob 162 may be disposed in the vacuum pump supply tube 158 to allow adjustment of the strength of the vacuum.

To provide the air jet discharge assist, some additional components are associated with the controller 84. The fourth valve of the manifold 102 is an air discharge control valve 150. This valve is a spring-return valve, and is connected to one of the slide block control switch pilot lines 135b by air jet pilot line 135c. The outlet end of the discharge control valve is connected to a discharge air flow regulator 152, and a coalescing filter 154. The filter/coalescer serves to prevent contaminants from being blown into the product from the air jet 64. A suitable product for this filter is model no. 15F22E from Parker Pneumatic. Advantageously, the compressed air supply for the discharge control valve 150 comes through pneumatic supply line 149, which diverts compressed air prior to the lubricator 92, so as not to have lubricant laden air discharged onto the product from jet 64. The discharge air flow regulator 152 allows adjustment of the air flow for the air jet 64. The air jet tube 164 is connected to the coalescing filter 154, and provides air to the air jet 64.

By virtue of the depicted configuration, the discharge control valve 150 only allows air to flow through the coalescing filter and to the air jet when a pilot signal of air is received through the pilot line 135c. This only happens during the forward sliding phase of the slide block, because pilot line 135b only sees pressure during that phase. Consequently, a burst of air from the air jet 64 will only occur when the product transfer pocket 56 is moving forward, to a position above the discharge pocket 30.

By virtue of its relatively simple configuration, the controller 84 of the present invention requires relatively simple controls. Viewing FIG. 1, the control panel 166 includes the "on" indicator 98, the emergency stop switch 96, the speed control knob 148, the air discharge valve control knob 152, and the vacuum control knob 162. Through manipulation of these simple controls, a user can adjust the speed and efficiency of operation of the volumetric pocket filler 10 to optimize the packaging of product as desired.

Figure 5:
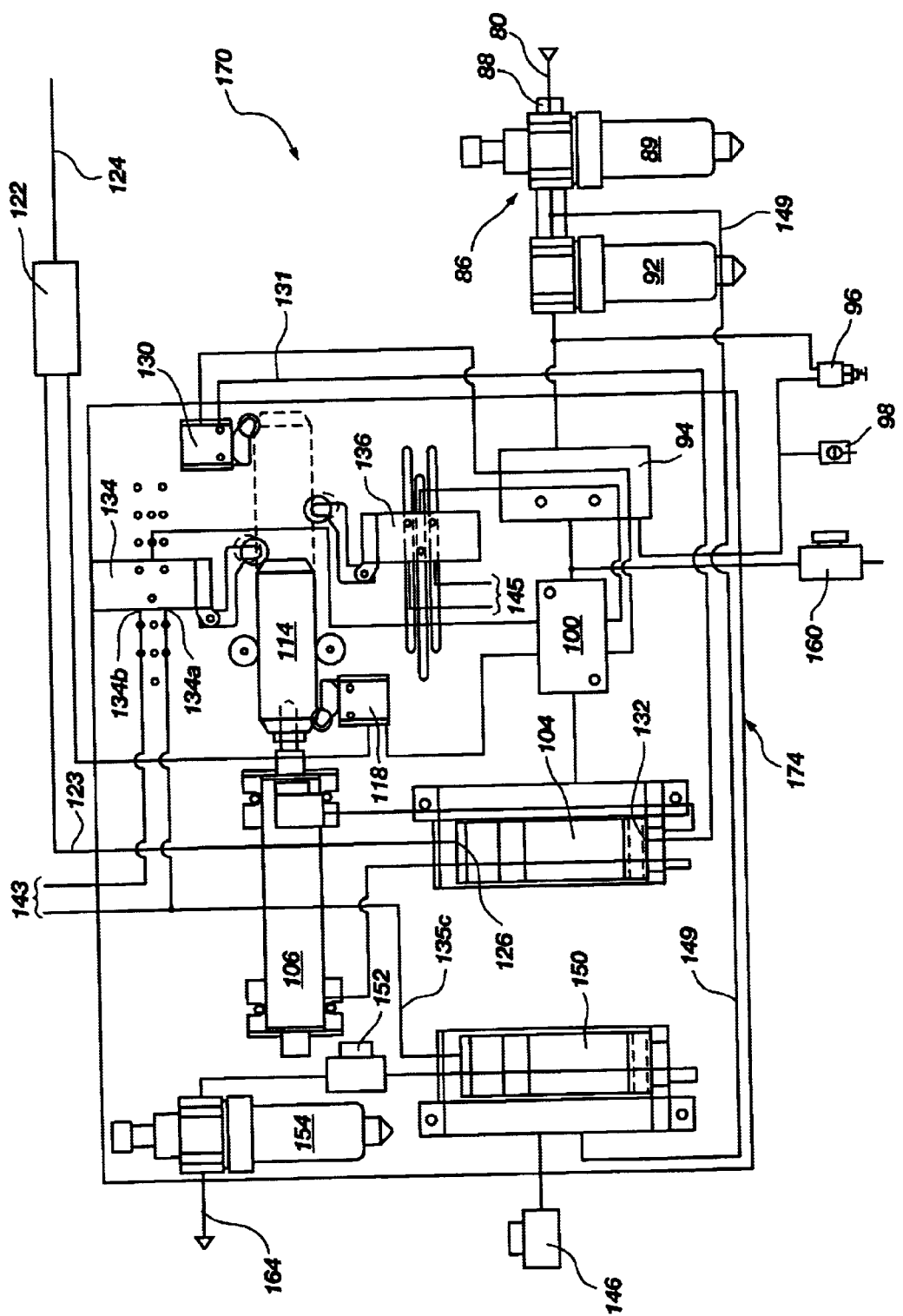
FIG. 5 is a plan view of an alternative pneumatic controller without an air distribution valve bank.

Referring to FIG. 5, an alternative embodiment of the controller 170 eliminates most of the air distribution valve bank (102 in FIG. 4) and provides direct pneumatic control of the components of the volumetric pocket filler 10. In this embodiment, the cycle control cylinder control valve 104—which supplies compressed air to the cycle control cylinder 106 and switches in response to air signals from the cycle home position switch 118 and the half cycle return switch 130—remains, as does the discharge control valve 150. However, the slide block control valve 142 and separator control valve 144 are omitted.

The inventors have found that the slide block control switch 134 and separator control switch 136 are capable of providing adequate air flow to fully actuate their respective filler components, rather than merely providing pilot impulses through pilot lines 134a and b and 136a and b to activate a separate control valve. Accordingly, as depicted in FIG. 5, the slide block control switch 134 is directly pneumatically connected to slide block actuation lines 143, which are connected to the slide block actuator 60. It will be apparent that for operation of the air jet 64 as described above, the air jet pilot line 135c is connected to the appropriate one of the slide block actuation lines 143. Similarly, the separator control switch 136 is directly pneumatically connected to separator actuation lines 145, which are connected to the separator actuator 36. This configuration further simplifies the controller, and reduces its cost.

Figure 6:
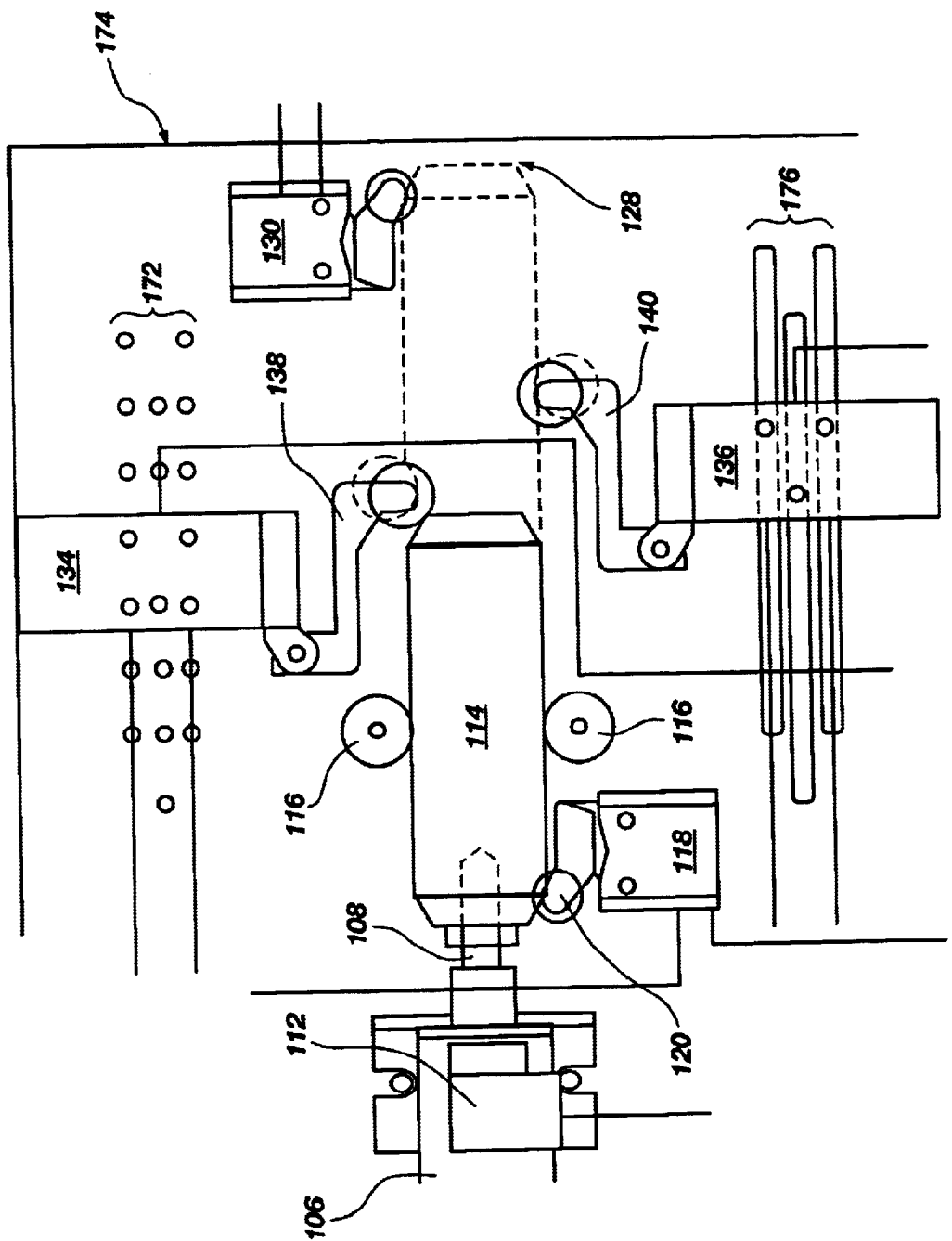
FIG. 6 is a close-up plan view of a portion of an alternative pneumatic controller wherein the location of the pneumatic control switches is adjustable.

As noted above, the relative timing of contact and release of the various switch actuator levers depends upon the physical location of the switches relative to the motion path of the actuator block during the motion circuit. Accordingly, to adjust the relative timing of these elements, it may be desirable to change the location of these switches. Referring to FIG. 6, in an alternative embodiment, the location of the pocket filler control switches 134 and 136 is adjustable. Rather than one fixed mounting location, a plurality of sets of slide block control switch mounting holes 172 are provided in the controller base 174 to allow the slide block control switch 134 to be mounted in multiple discrete positions relative to the motion path of the actuator block 114. To adjust the timing of the slide block 54 relative to the other components of the pocket filler 10, the user may simply detach the control switch from one location and reattach it at another. This is one method of providing an adjustable switch location.

In another alternative method of providing adjustable switch locations, also shown in FIG. 6, the separator control switch 136 is affixed to the controller base 174 by means of mounting slots 176. These slots allow a user to linearly adjust the location of the separator control switch, and fasten it in place where desired, using screws, bolts, or other fastening hardware associated with the separator control switch. It will be apparent that the multiple sets of mounting holes 172 shown with respect to the slide block control switch 134 provide only a limited number of discrete locations at which the switch may be placed. However, the slots 176 associated with the separator control switch 136 allows a very large number of possible mounting locations for this switch, within a discrete range, along the motion path of the actuator block.

While the controller 84 has been depicted with a specific number of pneumatic switches disposed along the motion path of the actuator block, it will be apparent that different numbers of switches may be provided if desired, in different orientations, and different types of switches may also be used. For example, while the switches are shown along two sides of the path of the actuator block 114, it will be apparent that switches could be placed along any side of this path, particularly if space considerations made it impractical to place the desired number of switches in the space available along just one or two sides of the actuator block.

Figure 8:
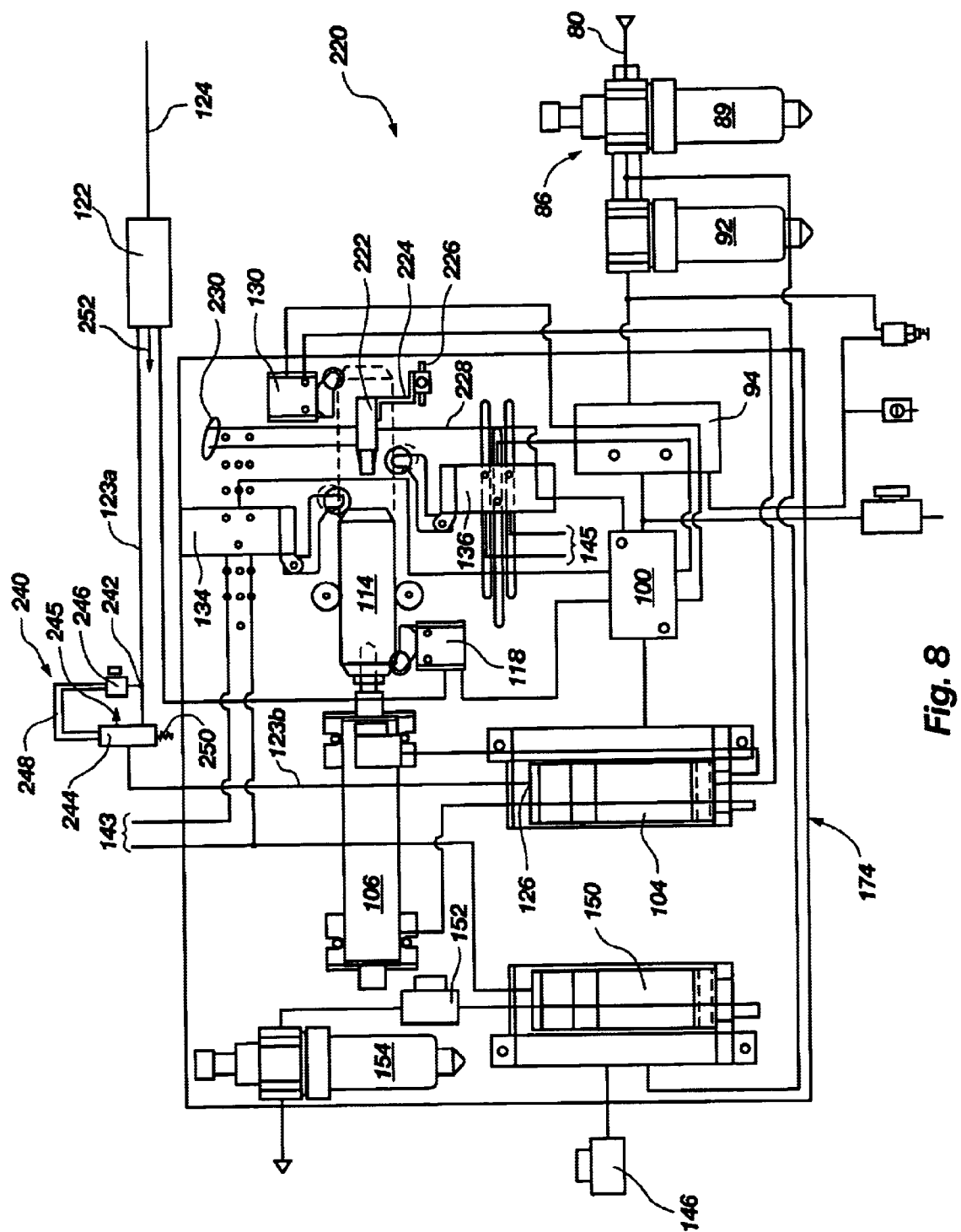
FIG. 8 is a plan view of the pneumatic controller of FIG. 5, with the addition of a "one shot" mechanism and a follower pocket control switch.

One example of an additional switch placed along the path of the actuator block is shown in FIG. 8. U.S. Pat. No. 6,145,552 discloses a Particulate Product Following System having a pneumatically actuated reciprocating follower pocket. A volumetric pocket filler which is controlled by the pneumatic controller of the present invention could include such a follower pocket system. Accordingly, viewing FIG. 8, a pneumatic controller 220 in accordance with the present invention could include a follower pocket control switch 222, disposed above the actuator block 114, oriented at a right angle to the other pneumatic switches. This switch could be mounted on a support bracket 224, which is connected to the controller base 174 through a mounting slot 226. The mounting slot allows linear adjustment of the location of the follower pocket control switch, so that its operational timing can be accurately coordinated with the other components of the system.

Figure 7:
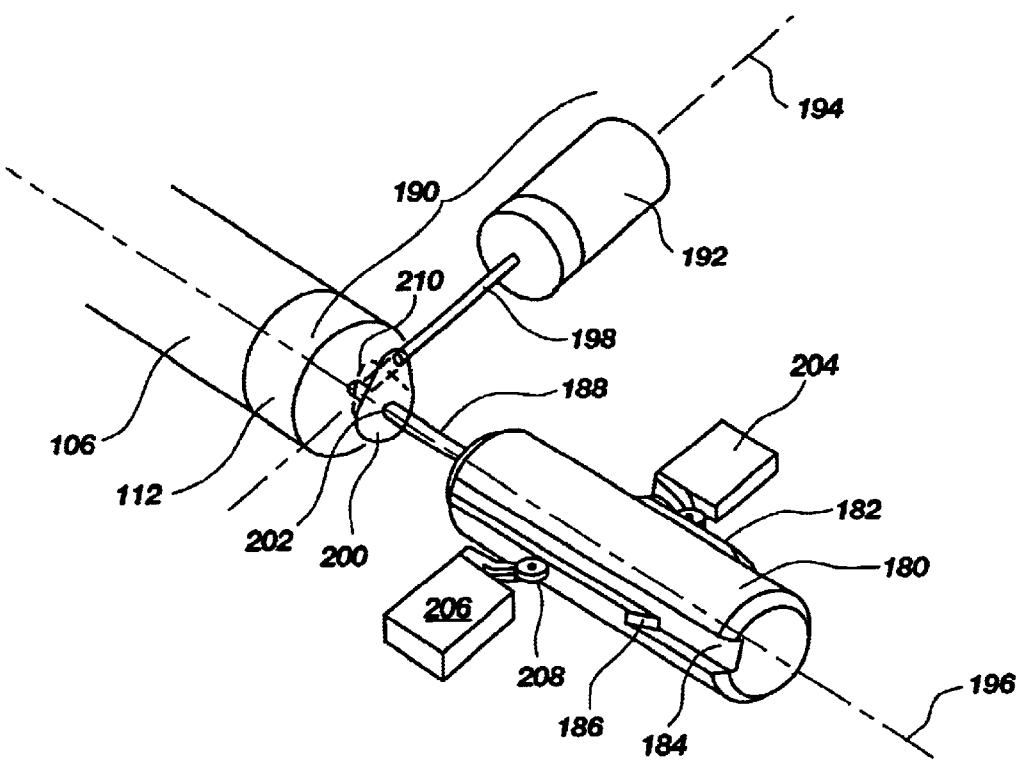
FIG. 7 is a pictorial view of an alternative actuator block having a non-uniform cross-section and a rotational actuator to axially rotate the actuator block during travel along its motion path.

The follower pocket control switch 222 receives compressed air through a follower pocket supply line 228 which extends from the manifold 100, and the switch selectively directs the compressed air to the follower pocket as a result of contact or lack of contact with the moving actuator block 114. Compressed air for controlling the follower pocket is provided from the switch 222 to the follower pocket (not shown in FIG. 8) through the follower pocket control lines 230. The return motion of the follower pocket could be controlled by a profile on the actuator block (see FIG. 7), or through an additional switch, pneumatic timer, etc. (not shown).

While the all-pneumatic embodiment heretofore described is preferred, the controller could be augmented with electrical switches (not shown) for contact with the actuator block, such as to control purely electrical components associated with the pocket filler. For example, some products may require a vibratory chute (not shown) or other comparable element to assist the product into the inlet tube 22. If it were desired to use such an electrical vibrator (not shown) of intermittent operation, an electrical switch similar in configuration to the slide block and separator switches could be placed along the path of the actuator block, and actuated in a similar manner. Alternatively, a level sensor (similar to level sensor 74 in FIG. 2) could be disposed in the inlet tube 22 and configured for turning the vibrator on and off.

While the actuator block 114 shown in FIG. 4 is of a uniform cross-section and therefore provides uniform operational timing of actuation of the switches, it will be apparent that it may be desirable to provide different operational timings for different switches. Accordingly, in an alternative embodiment depicted in FIG. 7, an alternative actuator block 180 may be configured with a non-uniform cross-section. For example, a protuberance 182 or trough 184 may be provided to cause brief contact with one switch during each half of the motion circuit cycle. Such an arrangement could be used for activating a product discharge air jet, for example, or a vibrating chute. It will also be apparent that multiple protuberances or troughs could be provided to actuate a given switch multiple times during a given half of the cycle. Additionally, the protuberances or troughs could be formed with gradual ramp surfaces 186 to allow gradual opening or closing of the associated switch/valve. This can allow gradual increase or decrease of pneumatic flow for certain components, if desired.

It will be apparent, however, that a protuberance 182 or trough 184 on the actuator block as described, without more, will still limit the system to symmetrical operation. Accordingly, to allow asymmetrical operation, a non-circular piston rod 188 (e.g. flattened along one side) may be linked to a rotational actuator 190 which is configured to axially rotate the piston rod and actuator block at any desired point in its motion path, and thereby expose various switches to different actuator block profiles. The rotational actuator 190 may comprise a pneumatic cylinder 192 disposed along an axis 194 which is perpendicular to the axis 196 of the piston rod. A rotational actuator piston rod 198 extends from the pneumatic cylinder 192, and is linked to a rotational linkage 200, which has a non-circular aperture 202 through which the piston rod slides. The rotational actuator piston rod 198 extends and retracts in response to pneumatic signals from its own control switch 204 (or multiple switches). The control switch 204 for the rotational actuator 190 is disposed along the path of the actuator block 180, to be actuated in the same manner as the other control switches.

To provide an asymmetrical control configuration, protuberances 182 and/or troughs 184 are formed in the actuator block 180 corresponding to a particular control switch at the various angular orientations of the actuator block. Considering switch 206, for example, when the actuator block extends, at some point it contacts this switch, initiating some action. However, after further extension of the actuator block, the roller contact 208 for the actuation lever of this switch then drops into the trough 184, and the switch 206 returns to its normal position. When the actuator block then contacts the rotational actuator control switch 204, this causes the rotational actuator 190 to rotate the rotational linkage 200 (and hence the piston rod 188 and actuator block 180) some discrete angle about the long axis 196, to a second angular position 210, shown in dashed lines. This rotation allows the roller contact 208 of the switch 206 to remain in the trough 184 during the return half of the cycle, thus actuating the associated component during the first half of the cycle only. When the actuator block returns to the home position, the rotational actuator 190 may then retract to its home position, rotating the actuator block to its initial position, allowing the cycle to repeat itself.

A similar arrangement could be created using protuberances 182 on the actuator block 180. A particular protuberance could be provided to actuate a given switch during one half (either the first or second half) of the motion path, then by rotating the piston rod and actuator block, preventing actuation during the other half of the path. It will also be apparent that the rotational actuator 190 could be configured with multiple extension points, allowing more than two angular orientations of the actuator block, and that the protuberances and troughs could be modified accordingly to provide many more complicated control schemes.

The pneumatic controller of the present invention may be modified to incorporate a "one shot" mechanism 240, as depicted in FIG. 8. If the product container conveyor were to stop or fail with a container in contact with the container sensor switch 122, holding that switch open, this would allow the controller to continue functioning, causing the volumetric pocket filler to continue to measure and discharge product. However, because the container conveyor would be stopped, the product would continuously, repeatedly, discharge into a single container. If the machine were not carefully observed, this could waste a substantial quantity of product before an operator could manually stop the machine.

The "one shot" mechanism 240 comprises several pneumatic components interposed in the pilot line 123 (FIG. 4) between the container sensor switch 122 and the first air distribution valve 104, thus dividing the pilot line into two parts, designated 123a and 123b in FIG. 8. The "one shot" mechanism 240 comprises a tee 242, which connects to the first part 123a of the pilot line, and directs compressed air flowing therein to (1) the input of the one shot valve 244, and (2) the input side of the one shot flow control valve 246. A large diameter return tube 248 connects the output side of the flow control valve 246 to the "off" side of the one shot valve 244. The second part 123b of the pilot line then continues from the output of the one shot valve to the first air distribution valve 104.

The one shot valve 244 is similar to the air distribution valve 104, and similar parts may be used, except that the one shot valve 244 includes a spring return 250 on the "on" side, and is pilot controlled only on the "off" side. The flow control valve 246 is an adjustable needle valve, such as part #7065-56-11 available from Legris. The return tube 248 is a piece of larger diameter tubing, which effectively serves as an air reservoir. For example, in one embodiment, the pilot lines throughout the pneumatic controller (such as the pilot line 123) are typically 5/32" diameter tubing. However, the one shot return tube is 1/4" in diameter, and its length is set or adjusted to provide an appropriate volume in this tube, for reasons which will be more apparent hereafter.

Advantageously, the "one shot" mechanism 240 prevents repeated discharge when the conveyor stops by requiring the controller to "reset" after each single discharge or "shot" of product. When the container sensor switch 122 is actuated by physical contact with a container on the conveyor, compressed air flows through the pilot line 123a to both the one shot valve 244 and the one shot flow control valve 246. The spring return 250 of the one shot valve keeps that valve normally open. Thus, when the container sensor switch is actuated, air initially flows through the one shot valve and the second part 123b of the pilot line to the first air distribution valve 104, allowing compressed air to flow to the cycle control cylinder 106 to extend the piston 108 and begin the motion path.

However, at the same time that air initially flows through the one shot valve 244, air is also allowed to flow into the return tube 248. The flow control valve 246 and the return tube are "tuned" to each other, so that the flow rate of air into the return tube relative to its internal volume creates a time delay before sufficient pressure builds up in the return tube to cause the one shot valve 244 to switch to the "off" position. This time delay allows the air to flow through the second portion 123b of the pilot line, so as to switch the first air distribution valve 104 as described, to initiate one cycle before the one shot valve switches off.

However, when the pressure in the return tube builds up sufficiently, this causes the one shot valve to close, preventing subsequent cycles until the container sensor switch 122 is released. It will be apparent that in this configuration, compressed air will likewise dissipate from the second portion 123b of the pilot line because the one shot valve 244 has closed the air passage from 123a to 123b, and has vented 123b to the atmosphere through exhaust port 245.

The container sensor switch 122 includes an exhaust port 252, which is open when the whisker 124 is not deflected. This exhaust port is in communication with the first portion 123a of the pilot line, and allows compressed air in that line to dissipate rapidly when the whisker switch is not deflected. This provides the reset function mentioned. After a container passes by and no longer deflects the container sensor switch, the switch returns to its default position, releasing air from the input and "off" sides of the one shot valve 244 through the exhaust port 252, allowing the spring return 250 to re-open the one shot valve in preparation for the next container. Because there is no air pressure in pilot line 123b except for a momentary "one shot" air control signal, this allows the first air distribution valve 104 to be reversed in response to a signal from the cycle return switch 130 when the actuator block 114 contacts it.

With the configuration shown in FIG. 8, only after the container sensor switch 122 is both depressed and subsequently released can the controller 220 allow a subsequent cycle. This "one shot" feature prevents one container from receiving more than one deposit of product, should the conveyor stop with the container still in contact with the sensor switch.

The "one shot" feature also provides additional advantages. It will be apparent that, because it is adjustable, the flow control valve 246 could be completely closed, without pressurized air in the return tube 248. This configuration would keep the one shot valve 244 continuously open, thus effectively disabling the one shot feature and allowing the controller of FIG. 8 to function in the same manner as that of FIG. 5. Such a configuration could be desirable for situations where a user desired to fill larger containers without reconfiguring the volumetric pocket filler or controller. For example, a worker could place a larger container beneath the discharge head, and depress the container sensor switch until a certain number of quantities had been discharged into the container. Upon release of the container sensor switch, the machine would not discharge any additional quantities until the container sensor were again depressed. The worker could then repeat this procedure for subsequent containers.

Alternatively, the flow control valve 246 could be opened some small amount so that the time delay before closing of the one shot valve 244 is long enough to allow two, three, or some other desired number of measured quantities to be discharged before the system resets. Again, this feature could be desirable for filling containers which hold a quantity that is some multiple of the quantity which the volumetric pocket filler is designed to discharge in one cycle. This can allow relatively radical adjustment of the operation of the system simply through turning a valve, rather than removing and replacing the slide block, adjusting the pneumatic switch positions, adjusting the speed of the actuator block, etc.

While the "one shot" feature has been disclosed as a configuration of direct pneumatic control devices, it could also be constructed in other ways. For example, the "one shot" feature could be accomplished through the use of air logic controls, and/or electronic memory paths, etc.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A controller for a volumetric pocket filler having a plurality of pneumatically powered components, comprising:
    a pneumatically powered actuator, moveable along a motion path;
    a plurality of pneumatic switches, configured to be pneumatically coupled to the plurality of pneumatically powered components of the volumetric pocket filler, and disposed along the motion path of the actuator, contactable by the actuator as the actuator moves along the motion path to actuate the switches to control air flow to the plurality of pneumatically powered components of the volumetric pocket filler.

2. The controller according to claim 1, wherein a location of at least one of the plurality of pneumatic switches is adjustable relative to the motion path of the actuator, configured to adjust a relative timing of operation of a pneumatically powered component associated with the at least one pneumatic switch.

3. The controller according to claim 1, wherein the pneumatically powered actuator comprises:
    an actuator block, moveable along the motion path; and
    a cycle control cylinder, coupled to the actuator block, to move the actuator block.

4. The controller according to claim 3, wherein the motion path is substantially linear, and the actuator block moves along the motion path from a home position to an extended position, and back to the home position.

5. The controller according to claim 4, further comprising:
    a half-cycle return switch, operatively coupled to the cycle control cylinder, disposed near the extended position of the actuator block, and configured to trigger reversal of a direction of movement of the actuator block; and
    a home position switch, operatively coupled to the cycle control cylinder, disposed near the home position, and configured to stop movement of the actuator block upon return to the home position.

6. The controller according to claim 3, wherein the actuator block has a varying cross-sectional shape, such that contact of the actuator block with at least one of the plurality of pneumatic switches is variable during the movement of the actuator block along the motion path.

7. The controller according to claim 6, further comprising an indexing mechanism configured to axially rotate the actuator block a discrete increment about the motion path of the actuator, such that contact of the actuator block with selected ones of the plurality of pneumatic switches is further variable.

8. The controller according to claim 3, further comprising a one shot cycle control system, configured to prevent undesired repeated operation of the controller.

9. The controller according to claim 8, wherein the one shot cycle control system comprises:
    a container sensor switch, configured to detect the presence of a container to be filled near the volumetric pocket filler;
    a one shot valve, having an inlet in fluid communication with the container sensor switch, an outlet in fluid communication with the cycle control cylinder, a pilot connection, and an exhaust port, the one shot valve having a spring-return open condition, and a pilot controlled closed condition;
    an adjustable flow control valve, in fluid communication with the container sensor switch and the inlet of the one shot valve; and
    a return tube, having an internal volume, interconnecting the flow control valve to the pilot connection of the one shot valve; and
    the one shot cycle control system configured such that the one shot valve is open to allow compressed air to flow to the cycle control cylinder to initiate movement of the actuator block when the container sensor switch detects a container, air flowing into the return tube simultaneously therewith, and configured to close the one shot valve after pressure builds up in the return tube, the flow control valve being adjusted relative to the internal volume of the return tube, so as to create an adjustable time delay between (i) actuation of the container sensor switch, and (ii) switching of the one shot valve to the closed position.

10. The controller according to claim 1, further comprising:
    an air distribution valve bank, comprising a plurality of valves, each of the plurality of valves being associated with (i) one of the plurality of pneumatic switches and (ii) one of the plurality of pneumatically powered components of the volumetric pocket filler;
    pilot lines, connecting the pneumatic switches to their respective valves of the air distribution valve bank; and
    air supply lines, configured to connect each of the valves of the air distribution valve bank to an associated pneumatically powered component of the volumetric pocket filler, whereby at least some of the plurality of pneumatic switches provide pneumatic signals solely to switch the respective valves of the air distribution valve bank, and pneumatic power for actuation of the pneumatically powered components of the volumetric pocket filler is provided by the respective valves of the air distribution valve bank.

11. A volumetric pocket filler for measuring and dispensing product into a container, comprising:
- a pneumatically powered measuring and dispensing apparatus, configured to measure and dispense a discrete quantity of product into a container; and
- a controller, for controlling the operation of the measuring and dispensing apparatus, comprising:
  - a pneumatically powered actuator, moveable along a motion path; and
  - a pneumatic switch, pneumatically coupled to the measuring and dispensing apparatus, and disposed along the motion path of the pneumatically powered actuator, engageable by the actuator as the actuator moves to actuate the switch, to control air flow to the measuring and dispensing apparatus.

12. The volumetric pocket filler of claim 11, further comprising:
- a plurality of pneumatically powered components associated with the measuring and dispensing apparatus; and
- a plurality of pneumatic switches, disposed along the motion path of the actuator, to control air flow to the plurality of pneumatically powered components.

13. The controller according to claim 12, wherein at least some of the plurality of pneumatic switches are directly pneumatically connected to a respective pneumatically powered component of the measuring and dispensing apparatus.

14. The volumetric pocket filler according to claim 12, wherein the pneumatically powered measuring and dispensing apparatus further comprises:
- a conveyor, configured to move containers to be filled to a filling position adjacent the volumetric pocket filler;
- an inlet, configured to receive product to be dispensed;
- a separator, connected to the inlet, configured to separate the product into discrete portions;
- a slide block, having an outlet adjacent the filling position, and a discharge pocket, configured to receive discrete portions from the separator into the discharge pocket, and to move to discharge the discrete portions from the discharge pocket, through the outlet, and into the container to be filled.

15. The volumetric pocket filler according to claim 14, wherein the plurality of pneumatic switches includes a separator control switch to control operation of the separator, and a slide block control switch to control motion of the slide block.

16. The volumetric pocket filler according to claim 14, further comprising a one shot cycle control system to prevent undesired repeated operation of the controller in the event the conveyor stops.

17. The volumetric pocket filler according to claim 11, wherein a location of the pneumatic switch is adjustable relative to the motion path of the actuator, to thereby allow adjustment of relative timing of operation of a pneumatically powered component associated with the pneumatic switch.

18. A method of controlling a volumetric pocket filler having a plurality of pneumatically powered components, comprising the steps of:
- moving a pneumatically powered actuator block along a motion path from a home position;
- temporarily contacting a pneumatic switch, disposed along the motion path, the pneumatic switch being associated with one of the pneumatically powered components of the volumetric pocket filler; and
- returning the actuator block to its home position.

19. The method of claim 18, further comprising the step of adjusting a location of the pneumatic switch relative to a motion path of the actuator block, to thereby allow adjustment of relative timing of operation of the pneumatically powered component associated with the pneumatic switch.

20. The method of claim 18, further comprising the step of preventing undesired repeated motion of the actuator block by initiating movement thereof from the home position only when a container to be filled is detected near a filling position of the volumetric pocket filler.

* * * * *